(12) United States Patent
Lue et al.

(10) Patent No.: US 11,181,634 B1
(45) Date of Patent: Nov. 23, 2021

(54) SYSTEMS AND METHODS OF INTELLIGENT WEATHER SENSING USING DEEP LEARNING CONVOLUTIONAL NEURAL NETWORKS

(71) Applicant: Rockwell Collins, Inc., Cedar Rapids, IA (US)

(72) Inventors: Hsien-Chiang Lue, Cedar Rapids, IA (US); Steven Grossman, Cedar Rapids, IA (US); Venkata A. Sishtla, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 351 days.

(21) Appl. No.: 16/147,453

(22) Filed: Sep. 28, 2018

(51) Int. Cl.
| | | |
|---|---|---|
| *G01S 13/95* | (2006.01) | |
| *G01W 1/10* | (2006.01) | |
| *G06N 3/08* | (2006.01) | |
| *G05D 1/00* | (2006.01) | |
| *G06N 3/04* | (2006.01) | |

(Continued)

(52) U.S. Cl.
CPC ............ *G01S 13/953* (2013.01); *G01S 7/417* (2013.01); *G01W 1/10* (2013.01); *G05D 1/0088* (2013.01); *G06N 3/0454* (2013.01); *G06N 3/08* (2013.01); *G06N 20/00* (2019.01)

(58) Field of Classification Search
CPC ..... G01S 13/953; G01S 7/417; G06N 3/0454; G06N 3/08; G06N 20/00; G05D 1/0088; G01W 1/10
See application file for complete search history.

(56) References Cited

U.S. PATENT DOCUMENTS 5,359,330 A * 10/1994 Rubin ................... G01S 13/951
342/26 D
7,671,785 B1 * 3/2010 Walker ..................... H01Q 3/08
342/26 D (Continued)

OTHER PUBLICATIONS

D. Reichman and et al, "Some Good Practices for Applying Convolutional Neural Networks to Buried Threat Detection in Ground Penetrating Radar", 2017 9th International Workshop on Advanced Ground Penetrating Radar (IWAGPR) (pp. 1-5) (Year: 2017).*

(Continued)

*Primary Examiner* — Douglas Kay
(74) *Attorney, Agent, or Firm* — Suiter Swantz pc llo (57) ABSTRACT

A weather radar system includes a radio frequency (RF) receiver, an entity detector, and a machine learning circuit. The RF receiver generates a radar data signal based on a received radar return. The entity detector calculates an entity value based on the radar data signal, compares the entity value to a threat detection threshold, and outputs an indication of a threat based on the entity value exceeding the threat detection threshold. The machine learning circuit receives at least one of (1) sensor data regarding an environment about the antenna or (2) platform state data regarding a platform, executes a radar detection model to calculate an updated threat detection threshold based on the radar data signal and the at least one of the sensor data or the platform state data, and provides the updated threat detection threshold to the entity detector to update the entity detector.

17 Claims, 5 Drawing Sheets

(51) Int. Cl.
  *G06N 20/00* (2019.01)
  *G01S 7/41* (2006.01)

(56) References Cited

U.S. PATENT DOCUMENTS

| | | | | |
|---|---|---|---|---|
| 7,808,422 | B1* | 10/2010 | Woodell | G01S 7/2813 |
| | | | | 342/26 B |
| 8,089,391 | B1* | 1/2012 | Woodell | G01S 7/22 |
| | | | | 342/26 B |
| 8,203,480 | B1* | 6/2012 | Woodell | G01S 7/4026 |
| | | | | 342/26 B |
| 8,723,694 | B1* | 5/2014 | Finley | B64D 45/00 |
| | | | | 340/970 |
| 8,762,061 | B2* | 6/2014 | Yee | G01S 13/50 |
| | | | | 702/3 |
| 9,665,094 | B1* | 5/2017 | Russell | B64D 47/08 |
| 2008/0169975 | A1* | 7/2008 | Yee | G01W 1/02 |
| | | | | 342/26 R |
| 2014/0362088 | A1* | 12/2014 | Veillette | G01S 7/062 |
| | | | | 345/441 |
| 2016/0134644 | A1* | 5/2016 | Chan | H04L 67/18 |
| | | | | 726/7 |
| 2018/0341495 | A1* | 11/2018 | Culurciello | G06N 3/04 |
| 2018/0375188 | A1* | 12/2018 | Patel | H01Q 1/1264 |
| 2019/0050729 | A1* | 2/2019 | Lakshmanan | G08G 1/00 |
| 2019/0147331 | A1* | 5/2019 | Arditi | G05D 1/0274 |
| | | | | 706/20 |
| 2019/0340940 | A1* | 11/2019 | Elkabetz | G08G 5/0091 |

OTHER PUBLICATIONS

Dalto et al., "Deep Neural Networks for Ultra-Short-Term Wind Forecasting", 2015 IEEE Conference on Industrial Technology (ICIT), Mar. 2015. 7 pages.

* cited by examiner

SYSTEMS AND METHODS OF INTELLIGENT WEATHER SENSING USING DEEP LEARNING CONVOLUTIONAL NEURAL NETWORKS

BACKGROUND

The present disclosure relates generally to the field of weather radar systems. More particularly, embodiments of the inventive concepts disclosed herein relate to systems and methods of intelligent weather sensing using deep learning convolutional neural networks.

Weather radar systems can be used to detect weather during aircraft flight, and can be the primary equipment for aircraft navigating the bad weather during the flight. In existing systems, accurate interpretation and evaluation of radar data to detect weather and other threats using radar can be difficult, such as due to dynamic factors to which radar performance is sensitive.

SUMMARY

In one aspect, the inventive concepts disclosed herein are directed to a weather radar system. The weather radar system includes a radio frequency (RF) receiver, an entity detector, and a machine learning circuit. The RF receiver is configured to generate a radar data signal based on a received radar return. The entity detector is configured to calculate an entity value based on the radar data signal, compare the entity value to a threat detection threshold, and output an indication of a threat based on the entity value exceeding the threat detection threshold. The machine learning circuit is configured to receive the radar data signal, receive at least one of (1) sensor data regarding an environment about the antenna or (2) platform state data regarding a platform to which the antenna is coupled, execute a radar detection model to calculate an updated threat detection threshold based on the radar data signal and the at least one of the sensor data or the platform state data, and provide the updated threat detection threshold to the entity detector to update the entity detector.

In a further aspect, the inventive concepts disclosed herein are directed to a weather radar apparatus. The weather radar apparatus includes an antenna, and RF receiver, and a base assembly. The antenna is configured to receive radar returns and output an RF signal based on the received radar returns. The RF receiver is coupled to the antenna and configured to generate a radar data signal based on the RF signal. The base assembly supports the RF receiver and includes an entity detector and a machine learning circuit. The entity detector is configured to calculate a threat value based on the radar data signal, compare the threat value to a threat detection threshold, and output an indication of the threat based on the threat value exceeding the threat detection threshold. The machine learning circuit is configured to receive the radar data signal, receive at least one of (1) sensor data regarding an environment about the antenna or (2) platform state data regarding a platform to which the antenna is coupled, execute a radar detection model to calculate an updated threat detection threshold based on the radar data signal and the at least one of the sensor data or the platform state data, and provide the updated threat detection threshold to the entity detector to update the entity detector.

In a further aspect, the inventive concepts disclosed herein are directed to a method. The method includes generating, by a radio frequency (RF) receiver, a radar data signal based on a received radar return, calculating, by an entity detector, an entity value based on the radar data signal, comparing, by the entity detector, the entity value to a threat detection threshold, outputting, by the entity detector, an indication of a threat based on the entity value exceeding the threat detection threshold, receiving, by a machine learning circuit, the radar data signal, receiving, by the machine learning circuit, at least one of (1) sensor data regarding an environment about the antenna or (2) platform state data regarding a platform to which the antenna is coupled, executing, by the machine learning circuit, a radar detection model to calculate an updated threat detection criteria based on the radar data signal and the at least one of the sensor data or the platform state data, providing, by the machine learning circuit to the entity detector, the updated threat detection criteria to update the entity detector.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods of intelligent weather sensing using deep learning convolutional neural networks. The inventive concepts disclosed herein can be utilized in a number of radar systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a weather radar system includes a radio frequency (RF) receiver, an entity detector, and a machine learning circuit. The RF receiver is configured to generate a radar data signal based on a received radar return. The entity detector is configured to calculate an entity value based on the radar data signal, compare the entity value to a threat detection threshold, and output an indication of a threat based on the entity value exceeding the threat detection threshold. The machine learning circuit is configured to receive the radar data signal, receive at least one of (1) sensor data regarding an environment about the antenna or (2) platform state data regarding a platform to which the antenna is coupled, execute a radar detection model to calculate an updated threat detection threshold based on the radar data signal and the at least one of the sensor data or the platform state data, and provide the updated threat detection threshold to the entity detector to update the entity detector.

The weather radar system can be integrated with an airborne platform or other platform as described herein. For example, the avionics system can be an avionics system of the airborne platform, and the display system can be an aircraft cockpit display of the airborne platform.

Systems manufactured in accordance with the inventive concepts disclosed herein can improve operation of weather radar systems by more effectively identifying patterns using historical data and real-time sensor and aircraft state data, and enhancing the robustness of the on-board weather radar by adapting its detection algorithms. In existing systems, detecting weather and other entities using radar can be sensitive to dynamic factors such as temperature, altitude, time of year, and geographical location. An operator of the weather radar system may typically make subjective interpretations of radar data, which may only be as good as the operator's interpretation of the echoes that are displayed on the radar indicator. Further, existing detection algorithms may not effectively account for the dynamic factors that affect how radar data is evaluated. The present solution can reduce the work required to avoid weather threats, which can evolve dynamically during the course of flight, and increase the probability of a safe flight, by using machine learning solutions to adapt on-board detection performed by the weather radar systems, including in real-time. The present solution can reduce the need for subjective analysis of radar data, instead enabling the digital signal processing of the weather radar itself to adapt to dynamic factors. For example, the present solution can use a machine learning circuit to provide the operator with additional weather warning information assisting critical decision-making actions, reducing the in-flight weather hazard risk. The present solution can reduce flight test burden and associated costs for radar development, as the recurring optimization for various geographic regions, time of day, time of year, and flight phase can occur in real-time during flight.

Figure 1:
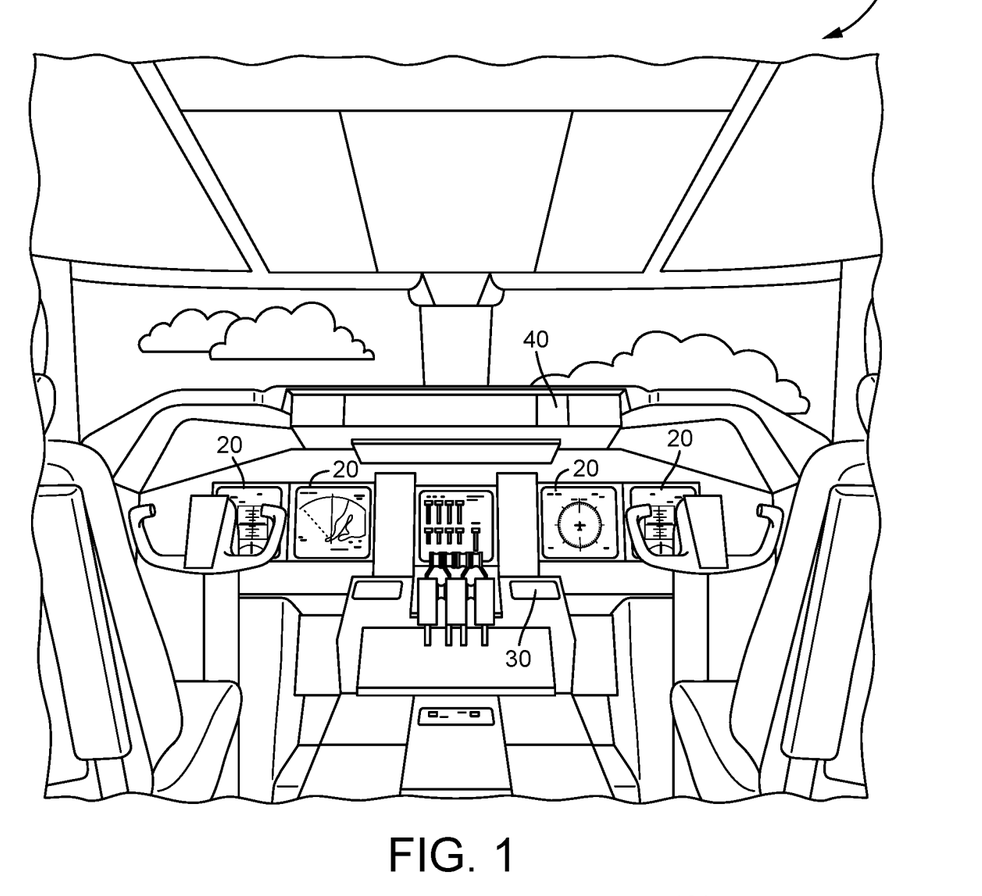
FIG. 1 is a schematic diagram of an exemplary embodiment of an aircraft control center according to the inventive concepts disclosed herein.

Referring to FIG. 1, a perspective view schematic illustration of an aircraft flight deck or cockpit 10 is shown accordingly to an exemplary embodiment of the inventive concepts disclosed herein. The aircraft flight deck 10 can be configured for an aircraft operator or other user to interact with avionics systems of an airborne platform. The aircraft flight deck 10 may include one or more flight displays 20 and one or more user interface ("UI") elements. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head down displays (HDDs), head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to display images generated based on sensor data or flight parameters modified according to the systems and methods of the inventive concepts disclosed herein.

(EICAS) display used to display critical engine and system status data. Other types and functions of the flight displays 20 are contemplated as well. According to various exemplary embodiments of the inventive concepts disclosed herein, at least one of the flight displays 20 may be configured to display images generated based on sensor data or flight parameters modified according to the systems and methods of the inventive concepts disclosed herein.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements may be incorporated by the flight displays 20 (e.g., the UI elements may appear on or be part of the flight displays 20). The UI elements may be configured to, for example, allow an aircraft crew member to interact with various avionics applications and perform functions such as data entry, manipulation of navigation maps, and moving among and selecting checklist items. For example, the UI elements may be used to adjust features of the flight displays 20, such as contrast, brightness, width, and length. The UI elements may also (or alternatively) be used by an aircraft crew member to interface with or manipulate the displays of the flight displays 20. For example, the UI elements may be used by aircraft crew members to adjust the brightness, contrast, and information displayed on the flight displays 20. The UI elements may additionally be used to acknowledge or dismiss an indicator provided by the flight displays 20. The UI elements may be used to correct errors on the flight displays 20. The UI elements may also be used to adjust the radar antenna tilt, radar display gain, and to select vertical sweep azimuths. Other UI elements, such as indicator lights, displays, display elements, and audio alerting devices, may be configured to warn of potentially threatening conditions such as severe weather, terrain, and obstacles, such as potential collisions with other aircraft.

Figure 2:
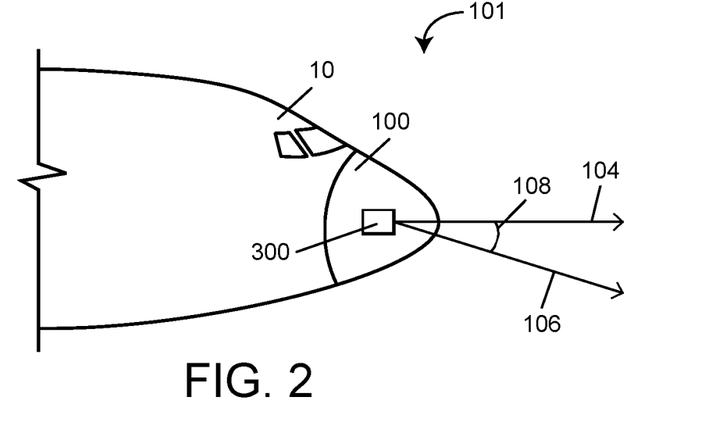
FIG. 2 is a schematic diagram of an exemplary embodiment of a nose of an aircraft including a weather radar system according to the inventive concepts disclosed herein.

Referring to FIG. 2, the front of an airborne platform 101 according to an exemplary embodiment of the inventive concepts disclosed herein is shown with aircraft control center 10 and nose 100. A radar system 300 (e.g., a weather radar system or other radar system) can be located within nose 100 of aircraft 101 or within aircraft control center 10 of aircraft 101. According to various embodiments, the radar system 300 may be located on the top of aircraft 101 or on the tail of aircraft 101. The radar system 300 may include or be coupled to an antenna system. A variety of different antennas or radar systems may be used (e.g., a split aperture antenna, a monopulse antenna, a sequential lobbing antenna, an electronically scanned array antenna).

The radar system 300 can sweep a radar beam horizontally back and forth across the sky. For example, the radar system 300 can transmit a radar signal, and receive a radar return signal corresponding to the transmitted radar signal (e.g., a reflection of the transmitted radar signal reflected by objects in the sky, such as clouds or other platforms). In some embodiments, the radar system 300 can execute a first horizontal sweep 104 directly in front of aircraft 101 and a second horizontal sweep 106 downward at a tilt angle 108 (e.g., 20 degrees down). The radar system 300 can electronically merge a plurality of radar return signals from different tilt angles to form a composite image for display on an electronic display (e.g., flight displays 20 described with reference to FIG. 1). The radar system 300 can process radar return signals to, for example, distinguish between terrain and weather, to determine the height of terrain, or to determine the height of weather. The radar system 300 can determine whether the radar return signals indicate a potential threat to the airborne platform 101, and output an alert representative of the potential threat.

The radar system 300 can include a terrain awareness and warning system (TAWS) and coordinate with associated user interface elements in aircraft control center 10 (e.g., displays 20, display elements on a weather radar display, display elements on a terrain display, audio alerting devices) to warn the pilot of potentially threatening terrain features.

Figure 3:
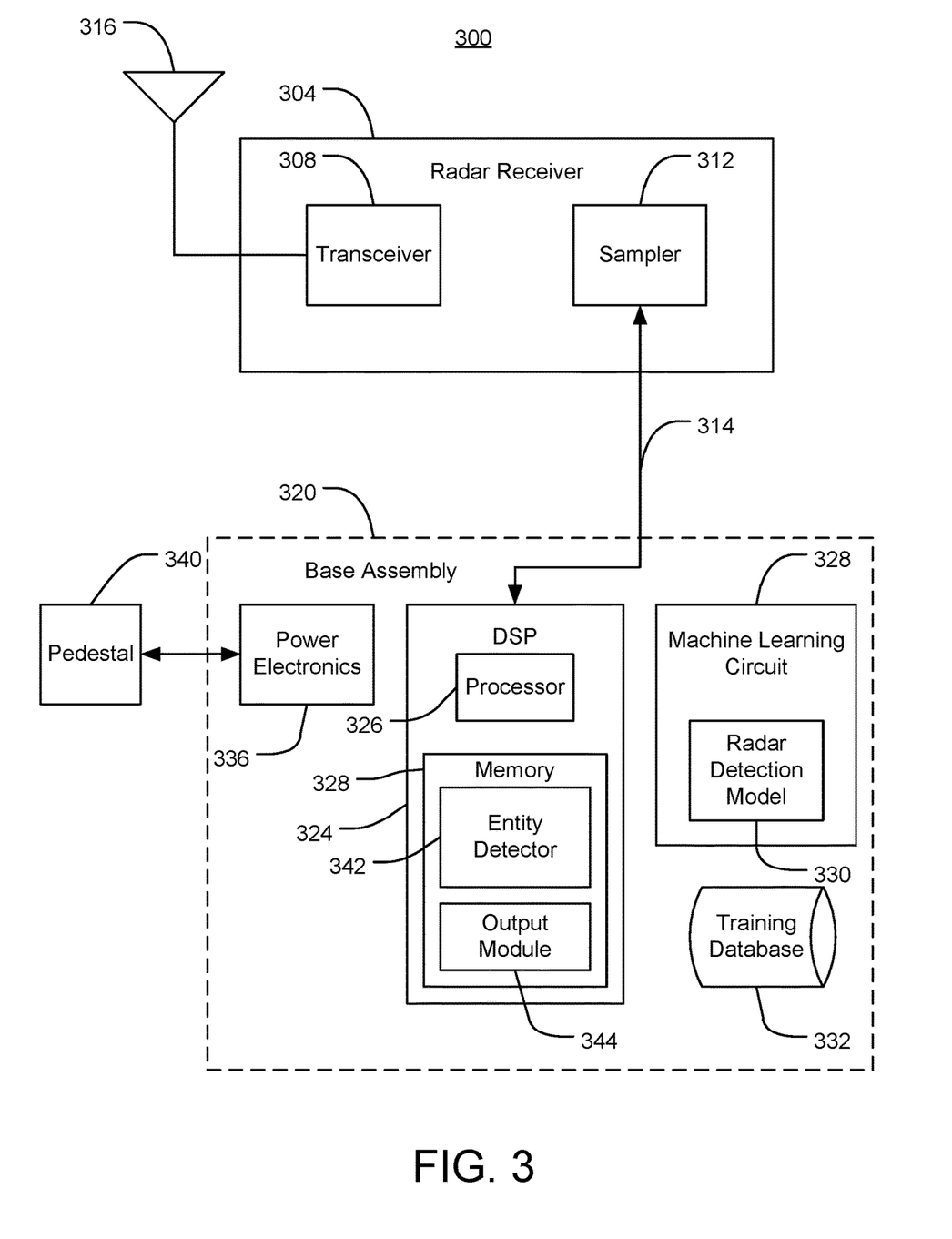
FIG. 3 is a block diagram of an exemplary embodiment of a radar system that includes a machine learning circuit according to the inventive concepts disclosed herein.

Referring now to FIG. 3, the radar system 300 according to an exemplary embodiment of the inventive concepts disclosed herein includes a radar receiver 304 (e.g., a radio frequency (RF) receiver) and a base assembly 320. The radar receiver 304 is coupled to one or more antennas 316 (e.g., a radio frequency antenna) that can transmit and/or receive radio frequency signals, such as to transmit a radar signal and receive a radar return signal corresponding to the transmitted radar signal. The radar receiver 304 includes a transceiver 308, which can include transmitter electronics to cause the antenna 316 to output a desired radar signal, and receiver electronics to receive the radar return signal via the antenna 316 and output an electronic signal (e.g., analog signal) corresponding to the radar return signal. The radar receiver 304 include a sampler 312, which can receive the electronic signal from the transceiver 308 and output a corresponding sampled signal 314. For example, the sampler 312 can include an analog-to-digital converter (ADC) that outputs the signal 314 as a digital signal corresponding to the analog electronic signal. The radar receiver 304 can output the signal 314 as an intermediate frequency signal to more effectively enable processing in a digital domain. The radar receiver 304 can generate the signal 314 to be a baseband signal.

The base assembly 320 can include a digital signal processor (DSP) 324 that receives the signal 314 from the radar receiver 304. The DSP 324 can include a processor 326 and memory 328. The processor 326 may be implemented as a specific purpose processor, an application specific integrated circuit (ASIC), one or more field programmable gate arrays (FPGAs), a group of processing components, or other suitable electronic processing components. The memory 328 is one or more devices (e.g., RAM, ROM, flash memory, hard disk storage) for storing data and computer code for completing and facilitating the various user or client processes, layers, and modules described in the present disclosure. The memory 328 may be or include volatile memory or non-volatile memory and may include database components, object code components, script components, or any other type of information structure for supporting the various activities and information structures of the inventive concepts disclosed herein. The memory 328 is communicably connected to the processor 326 and includes computer code or instruction modules for executing one or more processes described herein. The memory 328 includes various circuits, software engines, and/or modules that cause the processor 326 to execute the systems and methods described herein. The memory 328 can include an entity detector 412 and/or entity detector 524 as described with further reference to FIGS. 4 and 5. The DSP 324 may also be at least partially implemented by processing hardware remote from the base assembly 320, such as by an avionics computer of the platform.

The DSP 324 can process the signal 314 to generate information based on the radar signals represented by the signal 314. For example, the DSP 324 can process the signal 314 to calculate locations of objects around the radar system 300. The DSP 324 can calculate the velocity of a moving object based on the signal 314. The DSP 324 can use an entity detector 342 to determine the likelihood of the signal 314 representing a particular weather object (e.g., a particular type of cloud).

The radar system 300 includes a machine learning circuit 328 and a training database 332. The training database 332 can map historical radar data to entity data (e.g., various entities and/or threats detected based on the historical radar data, such as weather, terrain, or other platforms). For example, the training database 332 can include a plurality of data components, each data components assigning a type of detected entity (e.g., a type of cloud; lightning; thunder; rain; hail; turbulence; windshear; ice; a remote platform; a terrain feature) to one or more corresponding radar values that were detected when the type of detected entity was detected. The training database 332 can include training data generated by the DSP 324 and assigned to radar data received based on operation of the radar receiver 304, such as to add new data to the training database 332 in real-time. The DSP 324 and/or the machine learning circuit 328 can maintain the training database 332.

The training database 332 can include historical sensor data, including environment data, and/or historical platform state data. For example, the training database 332 can include temperature data, altitude data, freezing level data, time data, location data, time/date data, turbulence data, and/or total aircraft temperature (TAT) data (e.g., TAT anomaly data). In some embodiments, the training database 332 maps the historical sensor data to at least one of corresponding radar data or corresponding detected entity data. As such, the training database 332 can enable the machine learning circuit 328 to more accurately and/or precisely determine relationships between radar data and entities that the radar data may potentially correspond to, using the historical sensor data.

In some embodiments, the machine learning circuit 328 includes a processor and memory similar to DSP 324. In some embodiments, the machine learning circuit 328 includes one or more processing components configured for machine learning operations. For example, the machine learning circuit 328 can include a system-on-a-chip (SoC) and/or multiprocessor SOC configured for machine learning operations, such as a ZYNQ device from Xilinx, Inc. of San Jose, Calif. It has been found that such processing components can have six times greater images per second per Watt of machine learning inference relative to embedded graphical processing units (GPUs) and/or existing SoCs. In some embodiments, the machine learning circuit 328 executes a REVISION stack from Xilinx, Inc., which can rapidly take a trained machine learning model, such as a trained neural network, and deploy the trained machine learning model on the ZYNQ device for run-time execution (e.g., to update weather detection thresholds in real-time as further discussed herein). The machine learning circuit 328 can be implemented at least partially remote from the base assembly 320.

The machine learning circuit 328 can use the training database 332 to train a radar detection model 330, which can be a machine learning model. The machine learning circuit 328 can train the radar detection model 330 to predict weather or other entities based on received radar data and/or sensor data. The radar detection model 330 can include a function that receives radar data as an input variable, and outputs an indication of a detected entity as an output variable. In some embodiments, the radar detection model 330 also receives sensor data as an input variable, and outputs the indication of the detected entity further based on the sensor data.

The indication of the detected entity can include a type of weather. The indication of the detected entity can include a likelihood (e.g., a probability score) of the received radar data corresponding to one or more entities. For example, given particular values of received radar data, the radar detection model 330 can output a likelihood that the radar data represents a particular type of weather, another platform, terrain, or other features.

In some embodiments, the training database 332 includes radar data mapped to ground clutter, enabling the machine learning circuit 328 to train the radar detection model 330 to distinguish ground clutter from weather and other entities for detection. Existing weather radar systems may have difficulty distinguishing ground clutter from weather, such that existing systems determine particular radar data to represent weather when the radar data actually resulted from ground clutter. The training database 332 can assign to particular radar data an indication that the radar particular data represents ground clutter, so that when the machine learning circuit 328 trains the radar detection model 330, the machine learning circuit 328 can provide the particular data (representative of ground clutter) as an input to the radar detection model 330, and compare an output of the radar detection model 330—the indication of the detected entity— to the output of the radar detection model 330 in order to adjust the radar detection model 330 appropriately so that the radar detection model 330 more accurately identifies the particular radar data as representing ground clutter rather than weather or other entities.

The radar detection model 330 can include various machine learning models that the machine learning circuit 328 can train using the training database 332. The machine learning circuit 328 can execute supervised learning to train the radar detection model 330 using the training database 332. In some embodiments, the radar detection model 330 includes a classification model. In some embodiments, the radar detection model 330 includes a regression model. In some embodiments, the radar detection model 330 includes a support vector machine (SVM). In some embodiments, the radar detection model 330 includes a Markov decision process engine.

In some embodiments, the radar detection model 330 includes a neural network. The neural network can include a plurality of layers each including one or more nodes (e.g., neurons, perceptrons), such as a first layer (e.g., an input layer), a second layer (e.g., an output layer), and one or more hidden layers. The neural network can include characteristics such weights and biases associated with computations that can be performed between nodes of layers, which the machine learning circuit 328 can modify to train the neural network.

In some embodiments, the neural network includes a convolutional neural network (CNN). The machine learning circuit 328 can provide the input from the training database 332 in an image-based format (e.g., computed radar values mapped in spatial dimensions), which can improve performance of the CNN as compared to existing systems, such as by reducing computational requirements for achieving desired accuracy in predicting weather or other entities using radar data.

The CNN can include one or more convolution layers, which can execute a convolution on values received from nodes of a preceding layer, such as to locally filter the values received from the nodes of the preceding layer. The CNN can include one or more pooling layers, which can be used to reduce a spatial size of the values received from the nodes of the preceding layer, such as by implementing a max pooling function, an average pooling function, or other pooling functions. The CNN can include one or more pooling layers between convolution layers. The CNN can include one or more fully connected layers, which may be similar to layers of neural networks by connecting every node in fully connected layer to every node in the preceding layer (as compared to nodes of the convolution layer(s), which are connected to less than all of the nodes of the preceding layer).

The machine learning circuit 328 can train the neural network of the radar detection model (e.g., train the CNN) by providing input from the training database 332 (e.g., radar data and/or sensor data from the training database 332) to the first layer of the neural network. The neural network can generate a plurality of outputs based on the input variables, such as by executing computations between nodes of the layers. The machine learning circuit 328 can modify a characteristic of the neural network using an objective function (e.g., loss function), such as to reduce a difference between the plurality of outputs and the detected entity data of the training database 332 corresponding to the input from the training database 332. In some embodiments, the machine learning circuit 328 executes an optimization algorithm that can modify the weights and/or biases of the neural network to reduce the difference. The machine learning circuit 328 can execute the optimization algorithm until a convergence condition is achieved (e.g., a number of optimization iterations is completed; the difference is reduced to be less than a threshold difference).

The DSP 324 can generate an entity detection function of the entity detector 342 using the radar detection model 330. The entity detection function can include the radar detection model 330 or a representation thereof (e.g., a less computationally intensive representation of the radar detection model 330, such as a regression function or lookup table that the DSP 324 can use to approximate the radar detection model 330).

In some embodiments, the base assembly 320 includes power electronics 336 coupled to a pedestal 340. The power electronics 336 can include a power supply, and use power from the power supply to drive the pedestal 340. For example, the power electronics 336 can drive motors of the pedestal to adjust an orientation of the radar receiver 304 in scan and/or elevation axes, such as based on control commands received from the DSP 324, in order to target a particular location for radar detection. The power electronics 336 can be connected to a power supply of the airborne platform.

The DSP 324 can include an output module 344. The output module 344 can be implemented by the DSP 324 to generate display and/or audio data for presentation by a display device and/or an audio output device, such as flight displays 20 and/or UI elements described with reference to FIG. 1. For example, responsive to determining that the signal 314 represents a weather entity, a detected threat, or other such information, the output module 344 can generate an alert indicative of the entity represented by the signal 314. In some embodiments, the DSP 324 evaluates the signal 314 (e.g., the radar data thereof) based on at least one entity detection threshold and generates the alert to indicate the signal 314 meeting or exceeding the at least one entity detection threshold.

Figure 4:
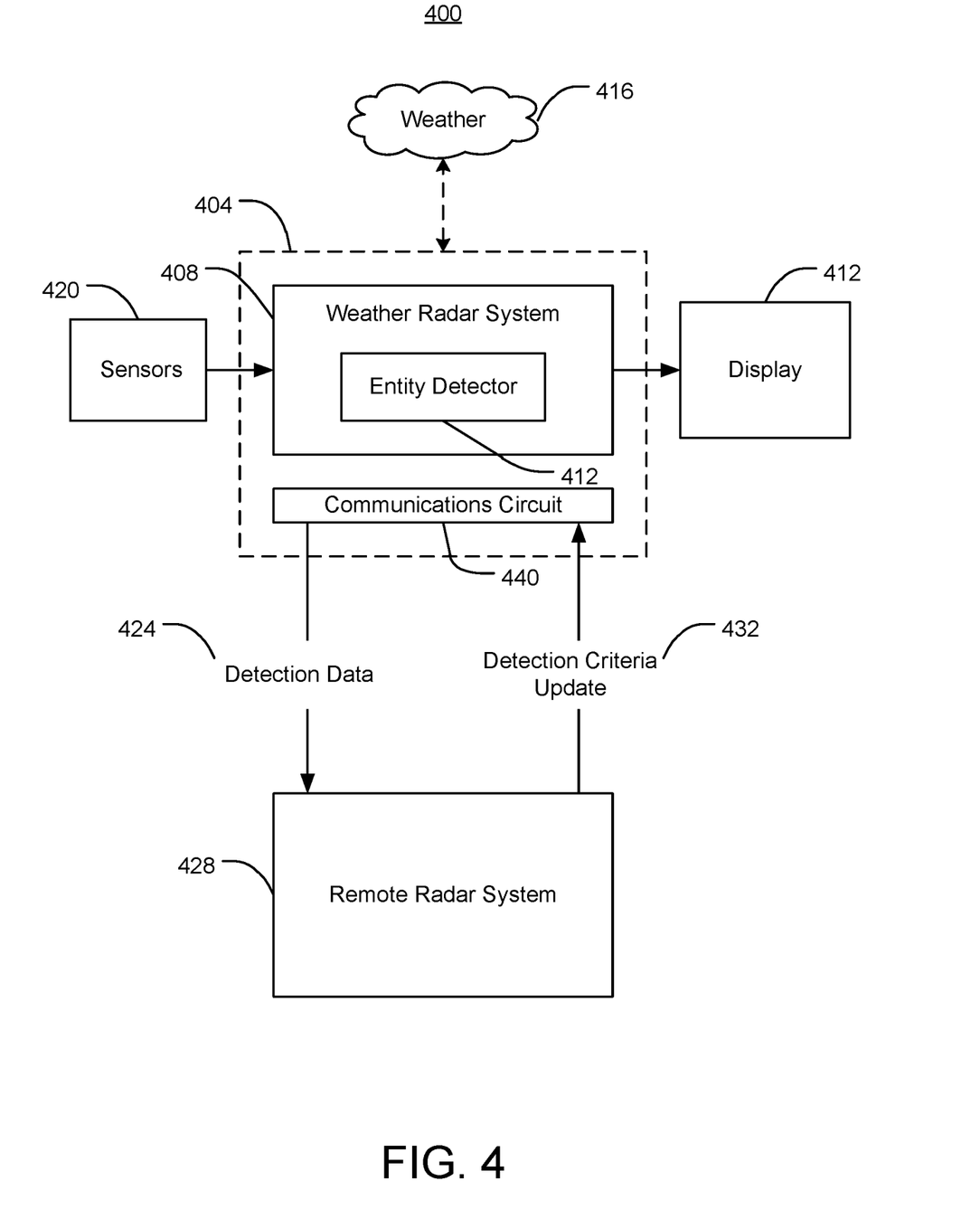
FIG. 4 is a block diagram of an exemplary embodiment of a weather radar system that communicates with a remote radar system according to the inventive concepts disclosed herein.

Referring now to FIG. 4, a radar system 400 according to an exemplary embodiment of the inventive concepts disclosed herein includes a weather radar system 408 implemented by a platform 404, such as an airborne platform. The weather radar system 408 can incorporate features of the radar system 300 described with references to FIGS. 2 and 3. The weather radar system 408 can output radar signals and receive radar return signals corresponding to various entities, such as weather 416. The weather radar system 408 can calculate information regarding weather 416, such as distance to the weather 416 and velocity of weather 416 (or other entities, such as other platforms, or terrain).

The weather radar system 408 can receive sensor data from one or more sensors 420. For example, the weather radar system 408 can receive aircraft situational data and/or environmental data such as temperature data, altitude data, energy state data (e.g., velocity, acceleration), freezing level data, time data, location data, time/date data, turbulence data, and/or TAT data. The one or more sensors 420 can detect, generate, and output sensor data regarding the platform (e.g., platform state data) and an environment about/ around the platform/antenna, including altitude and energy state variables, such as speed (e.g., vertical speed) and acceleration (e.g., vertical acceleration). The one or more sensors 420 can include various sensors, including but not limited to an inertial measurement unit (which may include one or more gyroscopes and one or more accelerometers, such as three gyroscopes and three accelerometers), an air data sensor (e.g., sensor(s) configured to detect and output an indication of static pressure), a magnetic compass, a navigation system, a vision system (e.g., a camera, an infrared image sensor, a LIDAR), a global navigation satellite system (GNSS), an altimeter, a true airspeed sensor, or an indicated airspeed sensor. The weather radar system 408 can map the received sensor data to radar data and/or entity detection data (e.g., in training database 332 described with reference to FIG. 3).

The weather radar system 408 includes an entity detector 412. The entity detector 412 can be similar to the entity detector 342 described with reference to FIG. 3. The entity detector 412 can use the received radar return signals to determine the received radar returns signals are indicative of one or more threats to the platform 404, including but not limited to entities that may be in a path of travel of the platform 404, such as weather, other platforms, or terrain.

In some embodiments, the entity detector 412 generates detection data 424 based on the received radar return signals (e.g., distances, velocities, shapes). The detection data 424 can include a threat value corresponding to one or more entities (e.g., threats) that may be represented by the received radar return signals. The detection data can also include sensor data received from the one or more sensors 420. The entity detector 412 detects one or more threats by evaluating one or more detection criteria using the detection data to determine whether the received radar return signals are indicative of one or more threats to the platform 404. The detection criteria may include threshold values associated with corresponding threat(s). For example, the detection criteria may include one or more threshold values indicating whether the received radar returns are indicative of a thunderstorm. The entity detector 412 can compare the detection data 424 to one or more threshold values, and output an indication of the one or more threats based on the comparison.

The weather radar system 408 can use a communications circuit 440 to communicate with a remote radar system 428. The communications circuit 440 can include receiver electronics and transmitter electronics. The communications circuit 440 can include a radio configured for radio frequency communication. The communications circuit 440 can include a datalink radio. The communications circuit 440 can enable the weather radar system 408 to receive and transmit radar-related information.

The weather radar system 408 can output display data for presentation by a display 412, which can incorporate features of the flight displays 20 and/or UI elements described with reference to FIG. 1. For example, the weather radar system 408 can output display data corresponding to detection data 424 and/or the detected one or more threats, such as to cause the display 412 to present an alert regarding the detected one or more threats.

The weather radar system 408 can transmit the detection data 424 to the remote radar system 428. For example, the weather radar system 408 can transmit radar return data, sensor data, and detected entity/detected threat data to the remote radar system 428. The weather radar system 408 can transmit the detection data 424 with an identifier corresponding to the detection data 424, such as a location corresponding to the detection data 424.

The remote radar system 428 can generate a detection criteria update 432 based on the detection data 424 received from the weather radar system 408. The remote radar system 428 can be a ground-based radar system. The remote radar system 428 can detect and/or receive remote radar data, such as by detecting radar data independently from the weather radar system 408. The remote radar system 428 can use a radar data communication network, such as the Next Generation Radar network (NEXRAD) to receive radar data from other entities (e.g., ground stations).

The remote radar system 428 can be used to establish a ground truth regarding radar data, such as for correlation with the detection data 424. For example, the remote radar system 428 can determine if the detection data 424 indicates that the weather radar system 408 accurately detected the one or more threats. In some embodiments, the remote radar system 428 retrieves the remote radar data (e.g., received via NEXRAD), and compares the remote radar date to the detection data 424 to determine whether the weather radar system 408 accurately detected the one or threats. The remote radar system 428 can use an identifier of the detection data 424 to identify the remote radar data to retrieve. For example, the remote radar system 428 can use the identifier to determine that the weather radar system 408 used particular radar data and sensor data to detect a first threat (e.g., a windshear threat) at a first location, and then use remote radar data corresponding to the first location to determine if there is a windshear threat at the first location. As such, the remote radar system 428 can independently verify the threat detection executed by the entity detector 412 of the weather radar system 408.

The remote radar system 428 can generate the detection criteria update 432 to cause the entity detector 412 to modify how the entity detector 412 determines threats, based on comparing the remote radar data to the detection data 424. For example, the remote radar system 428 can generate the detection criteria update 432 to modify the detection criteria of the entity detector 412, such as to provide updated detection threshold values to the entity detector 412, which can enable the entity detector 412 to more accurately execute threat detection. The weather radar system 408 can use the detection criteria update 432 to update the entity detector 412.

The remote radar system 428 can implement features of the machine learning circuit 328 described with reference to FIG. 3 to execute threat detection and to generate the detection criteria update 432, which can reduce a computational burden on the weather radar system 408 (e.g., enable the weather radar system 408 to have relatively less size, weight, power, and/or cost requirements). The remote radar system 428 can implement a remote training database similar to the training database 332 described with reference to FIG. 3, and include historical data in the remote training database (e.g., maintain the remote radar data in the remote training database). The remote radar system 428 can use the remote training database to generate the detection criteria update 432.

In some embodiments, the remote radar system 428 generates the detection criteria update 432 as a service bulletin transmission. For example, the remote radar system 428 can periodically transmit the detection criteria update 432 to the weather radar system 408. The remote radar system 428 can listen for a predetermined number of detection data 424 transmissions and/or listen for detection data 424 transmissions for a predetermined period of time, and based on the detection data 424 received accordingly, generate a corresponding detection criteria update 432.

In some embodiments, the remote radar system 428 generates and transmits the detection criteria update 432 in real-time (or near real-time). For example, responsive to receiving a detection data 424 transmission, the remote radar system 428 can generate and transmit the detection criteria update 432. The remote radar system 428 can include an indication of a detected threat based on the detection data 424 when generating the detection criteria update 432.

In some embodiments, the entity detector 412 detects threats including at least one of a turbulence threat, a high altitude icing threat, a weather threat, or a windshear and/or microburst threat.

Ice crystals at high altitude can pose a severe threat to the platform, such as by causing engine damage. For example, ice can accumulate on jet engine intakes, resulting in ice chunks that break off and severely damage the engine blades. This can result in engine roll backs and can sometimes cause total engine damage. The present solution can enable the entity detector 412 to account for environmental factors that has been determined to represent icing. Icing incidents typically occur in widespread areas of low reflectivity and away from thunderstorm cores. The presence of very cold cloud tops for the parent weather cell or system can increase a probability of presence of ice crystals.

The entity detector 412 can generate the detection data 424 to include sensor data from the one or more sensors 420 and detected radar data representative of the factors that may correspond to high altitude icing. For example, the entity detector 412 can generate the detection data 424 to include data representative of at least one of low reflectivity, thunderstorm core location, or cold cloud tops. The remote radar system 428 (e.g., a machine learning circuit thereof) can use the detection data 424 including the data representative of at least one of low reflectivity, thunderstorm core location, or cold cloud tops to train a radar detection model, and generate the detection criteria update 432 based on the trained radar detection model to update the entity detector 412. The entity detector 412 can compare the detected radar data to the updated one or more detection criteria (e.g., updated detection thresholds) to more accurately determine whether the detected radar data indicates high altitude icing.

Windshear and/or microbursts may be very short-lived, such as having a life span on the order of minutes. Existing weather radars can predict microbursts after they have fully developed but not during their development. In case of the Delta 191 accident (Aug. 2, 1985, DFW) a Learjet (N715JF) that led DL191 by 4 miles did not report any abnormal weather when it landed safely. Also, the crew would not be warned about a microburst if the aircraft is within the inhibit zone (time during phases of flight when all annunciations are inhibited) and a microburst develops.

The entity detector 412 can generate the detection data 424 to include sensor data from the one or more sensors 420 and detected radar data representative of the factors that may correspond to windshear and/or microbursts, to enable the weather radar system 408 to predict a microburst as it is developing. For example, the entity detector 412 can generate the detection data 424 to include parameters indicating at least one of a higher precipitation core extending to mid altitudes (the value of the peak dBz depends on geographic location); a rapidly decreasing precipitation core; a weak radial convergence at mid altitudes; a large drop in vertically integrated liquid (VIL); or a large drop in a height of an altitude of maximum reflectivity. The weather radar system 408 can measure and/or calculate these parameters for inclusion in the detection data 424. The remote radar system 428 (e.g., a machine learning circuit thereof) can use the detection data 424 including these parameters to train a radar detection model, and generate the detection criteria update 432 based on the trained radar detection model to update the entity detector 412. The entity detector 412 can compare the detected radar data to the updated one or more detection criteria (e.g., updated detection thresholds) to more accurately determine whether the detected radar data indicates windshear and/or microbursts.

The weather radar system 408 can calculate a likelihood of weather threats such as lightning, hail and/or convection. The weather radar system 408 can measure radar detectable parameters such as reflectivity at a certain temperature and vertically integrated liquid, and generate the detection data 424 to include these parameters. The remote radar system 428 (e.g., a machine learning circuit thereof) can use the detection data 424 including these parameters to update a radar detection model, and generate the detection criteria update 432 based on the trained radar detection model to update the entity detector 412. The entity detector 412 can compare the detected radar data to the updated one or more detection criteria (e.g., updated detection thresholds) to more accurately determine whether the detected radar data indicates weather threats such as lightning, hail, and/or convection.

Figure 5:
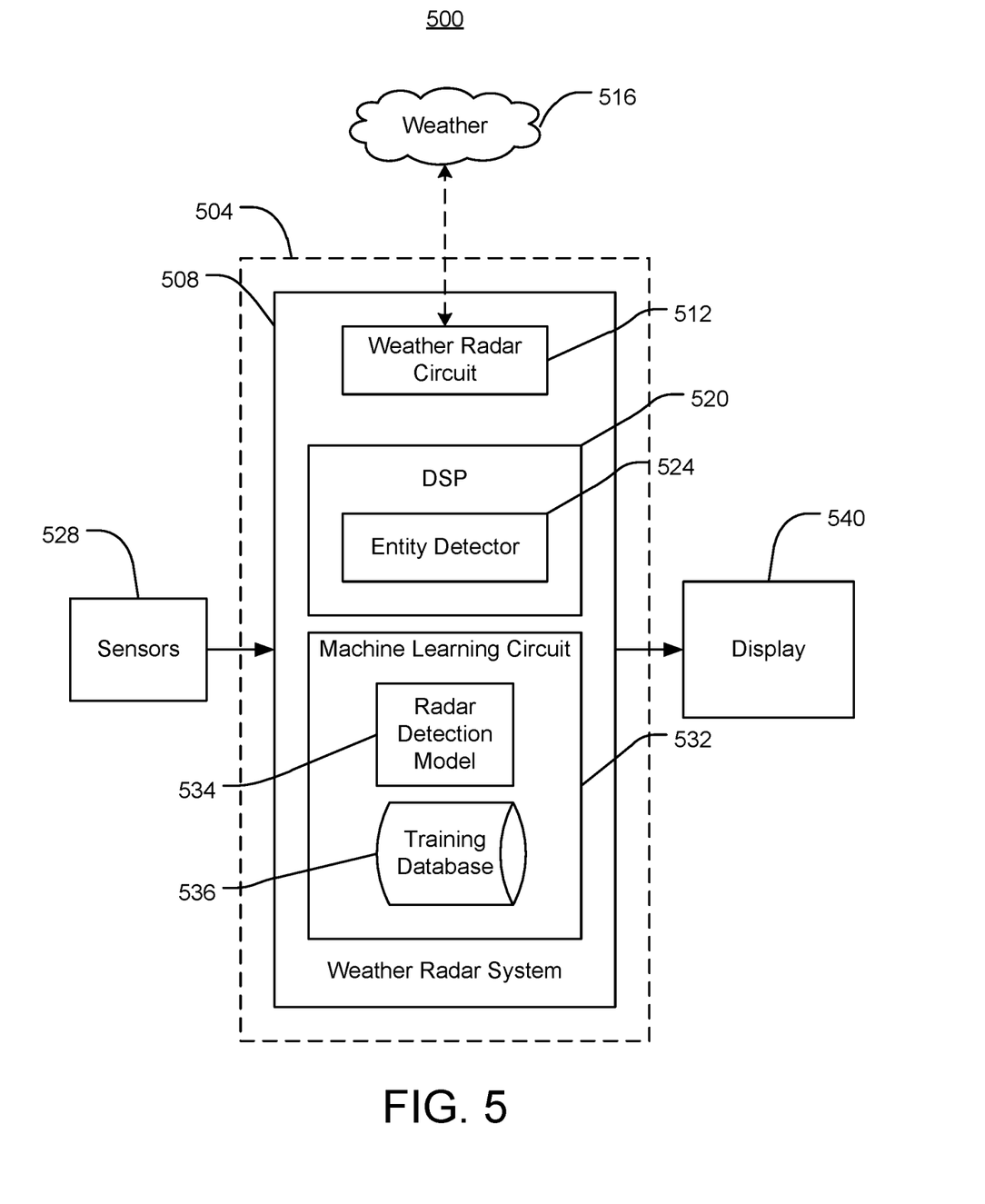
FIG. 5 is a block diagram of an exemplary embodiment of a weather radar system that includes a machine learning circuit according to the inventive concepts disclosed herein.

Referring now to FIG. 5, a radar system 500 according to an exemplary embodiment of the inventive concepts disclosed herein includes a weather radar system 508 implemented on a platform 504 and including a DSP 520 and a machine learning circuit 532. The weather radar system 508 can incorporate features of the radar system 300 described with reference to FIGS. 2-3, and can be similar to the weather radar system 408 described with reference to FIG. 4, except that weather radar system 508 implements the machine learning circuit 532 on the platform 504, rather than relying on updates from the remote radar system 428 each time an algorithm optimization is performed. The weather radar system 508 may still communicate with the remote radar system 428, such as to receive real-time weather data updates from the remote radar system 428, which can be maintained in a training database of the machine learning circuit 532 to increase the amount of data that the machine learning circuit 532 can process to generate a radar detection model. In various embodiments, the radar system 500 can enable an on-board weather radar that can be self-contained and provide a fully autonomous machine learning solution with improved weather and threat detection, while reducing a risk that communication errors with the remote radar system 428 disrupt the ability of the weather radar system 508 to appropriately update and optimize detection algorithms.

As shown in FIG. 5, the weather radar system 508 includes a weather radar circuit 512 that detects radar data regarding weather 516. A DSP 520 can receive the detected radar data from the weather radar circuit 512, and also receive detected sensor data from one or more sensors 528. The DSP 520 can provide various display data to a display 540 for presentation by the display 540.

The DSP 520 includes an entity detector 524, which can process the detected radar data and the detected sensor data using one or more detection criteria to generate an indication of one or more threats in a similar manner as the entity detector 412 described with reference to FIG. 4. For example, the entity detector 524 can use the detected radar data and the detected sensor data to evaluate one or more detection criteria and output an indication of one or more detected entities and/or threats based on the evaluation.

The machine learning circuit 532 can maintain the detected radar data, the detected sensor data, and any data received from remote sources (e.g., remote radar system 428) in the training database 536. The machine learning circuit 532 can train a radar detection model 534, such as a CNN of the radar detection model 534, using the data maintained in the training database 536. The machine learning circuit 532 can provide the radar detection model 534, or a representation thereof, such as detection thresholds, to the entity detector 524.

The machine learning circuit 532 can enable the entity detector 524 to more accurately account for a broader range of data factors that affect the relationship between detected radar data and the entities actually represented by the detected radar data. For example, the machine learning circuit 532 can use the sensor data from the one or more sensors 528 to update the radar detection model 534, and thus generate threshold update data and other such updates that the entity detector 524 can use when determining whether the radar data detected by the weather radar circuit 512 represents entities such as threats (e.g., high altitude ice crystals, turbulence, windshear, lightning, hail, convection), and similarly to distinguish ground clutter. In some embodiments, the machine learning circuit 532 enables the entity detector 524 to account for such factors in real-time or near real-time, by responsively updating the radar detection model 534 and/or the entity detector 524 when sensor data is detected.

Figure 6:
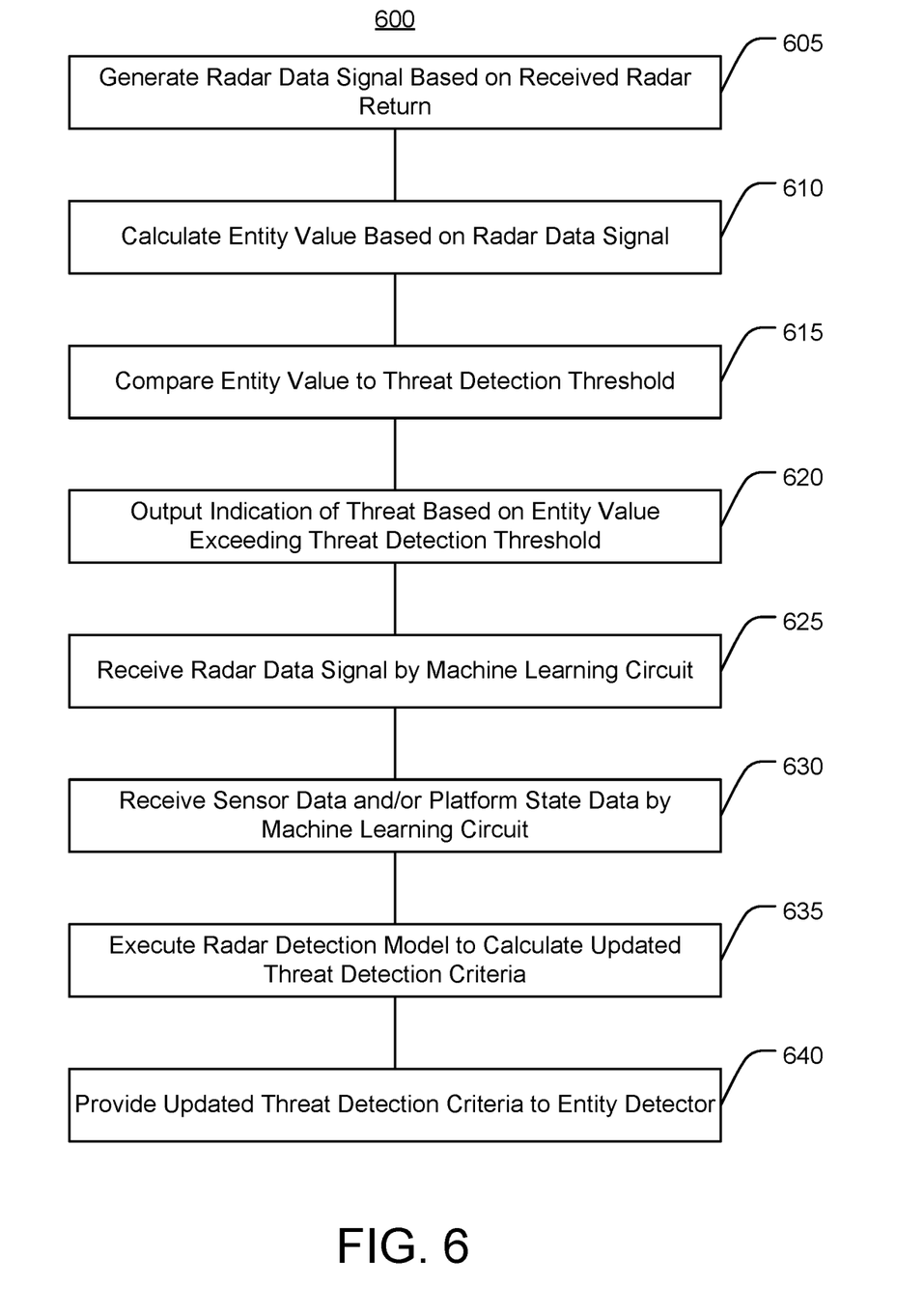
FIG. 6 is a block diagram of an exemplary embodiment of a method of operating a weather radar system according to the inventive concepts disclosed herein.

Referring now to FIG. 6, an exemplary embodiment of a method 600 according to the inventive concepts disclosed herein may include one or more of the following steps. The method 600 may be performed using various systems described herein, such as the radar system 300, the weather radar system 400, and/or the weather radar system 500.

A step (605) may include generating, by a radio frequency (RF) receiver, a radar data signal based on a received radar return. The RF receiver can be coupled to one or more antennas (e.g., a radio frequency antenna) that can transmit and/or receive radio frequency signals, such as to transmit a radar signal and receive a radar return signal corresponding to the transmitted radar signal. The RF receiver can include an analog-to-digital converter (ADC) that outputs the radar data signal as a digital signal corresponding to an analog electronic signal received from the one or more antennas. The RF receiver can output the radar data signal as an intermediate frequency signal to more effectively enable processing in a digital domain. The RF receiver can generate the radar data signal to be a baseband signal.

A step (610) may include calculating, by entity detector, an entity value based on the radar data signal. The entity value may represent a parameter corresponding to the radar data signal, such as distance, velocity, or Doppler data. The entity value can indicate a probability score of the radar data signal representing any of a variety of threats.

A step (615) may include comparing, by the entity detector, the entity value to a threat detection threshold. The threat detection threshold may be indicative of the entity value representing a particular entity and/or threat. For example, the threat detection threshold may be set to a value at which it may be expected that the radar data signal represents weather entities, another platform, or terrain.

A step (620) may include outputting, by the entity detector, an indication of a threat based on the entity value exceeding the threat detection threshold. For example, if the entity value exceeds the threat detection threshold, the entity detector can determine that the radar data signal represents a particular entity and/or threat corresponding to the threat detection threshold.

A step (625) may include receiving, by a machine learning circuit, the radar data signal. The machine learning circuit can include a system-on-a-chip (SoC) and/or multiprocessor SOC configured for machine learning operations. In some embodiments, the machine learning circuit is included in a base assembly of a weather radar apparatus that also includes the entity detector.

In some embodiments, the machine learning circuit is implemented by a remote radar system remote from the entity detector, and wirelessly communicates with the entity detector. The remote radar system can receive the radar data signal and other data from the entity detector as a detection data signal, process the detection data signal, and transmit detection criteria updates to the entity detector based on the detection data signal. The remote radar system can transmit the detection criteria updates as a service bulletin (e.g., a relatively infrequent transmission that may be based on many detection data signals) or in real-time/near-real-time.

A step (630) may include receiving, by the machine learning circuit, at least one of (1) sensor data regarding an environment about the antenna or (2) platform state data regarding a platform to which the antenna is coupled. The at least one of the sensor data or the platform state data can include temperature data, altitude data, energy state data, freezing level data, time data, location data, time/date data, turbulence data, and/or TAT data.

A step (635) may include executing, by the machine learning circuit, a radar detection model to calculate an updated threat detection criteria based on the radar data signal and the at least one of the sensor data or the platform state data. The radar detection model can generate an output representative of detected entities based on received radar data. The radar detection model can generate the output further based on the at least one of the sensor data or the platform state data.

In some embodiments, the radar detection model includes a machine learning model, such as a convolutional neural network (CNN). The CNN can include an input layer, a convolutional layer, a plurality of hidden layers, and an output layer. The machine learning circuit can train the CNN by providing training data to the CNN including historical radar data mapped to at least one of (1) sensor data regarding an environment about the antenna or (2) platform state data regarding a platform to which the antenna is coupled. The historical radar data is also mapped to entities and/or threats that were detected based on the historical radar data. The machine learning circuit can cause the radar detection model to generate one or more model threats, compare the one or model threats to one or more historical threats corresponding to the historical radar data, and modify at least one of a bias or a weight of the plurality of hidden layers to reduce a difference between the one or more model threats and the one or more historical threats.

A step (640) may include providing, by the machine learning circuit to the entity detector, the updated threat detection criteria to update the entity detector. As such, the machine learning circuit can enable the entity detector to more rapidly and accurate detect entities and threats, including by accounting for dynamic factors represented by the sensor data and platform data.

As will be appreciated from the above, systems and methods of intelligent weather sensing using deep learning convolutional neural networks can improve operation of weather radar electronics by increasing the speed and accuracy by which the radar electronics detect entities and threats, including but not limited to high altitude icing, windshear, microbursts, hail, lightning, and convection.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A weather radar system, comprising:
 a radio frequency (RF) receiver configured to generate a radar data signal based on a received radar return;
 an entity detector configured to:
  calculate an entity value based on the radar data signal;
  compare the entity value to a threat detection threshold; and
  output an indication of a threat based on the entity value exceeding the threat detection threshold; and
 a machine learning circuit configured to:
  receive the radar data signal;
  receive at least one of (1) sensor data regarding an environment about an antenna or (2) platform state data regarding a platform to which the antenna is coupled;
  execute a radar detection model to calculate an updated threat detection threshold based on the radar data signal and the at least one of the sensor data or the platform state data, wherein the radar detection model includes a convolutional neural network including an input layer, a plurality of hidden layers, and an output layer; and
  provide the updated threat detection threshold to the entity detector to update the entity detector,
 the machine learning circuit trains the radar detection model by:
  providing training data to the input layer of the convolutional neural network of the radar detection model, the training data including historical radar data mapped to at least one of (1) historical sensor data or (2) historical platform state data;
  causing the radar detection model to generate one or more model threats;
  comparing the one or model threats to one or more historical threats corresponding to the historical radar data; and
  modifying at least one of a bias or a weight of the plurality of hidden layers of the convolutional neural network of the radar detection model to reduce a difference between the one or more model threats and the one or more historical threats.

2. The weather radar system of claim 1, wherein the entity detector generates the entity value to indicate a probability score of the radar data signal representing the threat.

3. The weather radar system of claim 1, comprising:
 a remote radar system that implements the machine learning circuit, wherein the entity detector uses a wireless communications circuit to transmit the radar data signal as a detection data signal to the remote radar system; and
 the remote radar system uses the machine learning circuit to generate a detection criteria update including the updated threat detection threshold and transmits the detection criteria update for reception by the wireless communications circuit.

4. The weather radar system of claim 3, wherein the remote radar system generates the detection criteria update as a service bulletin.

5. The weather radar system of claim 3, wherein the remote radar system generates the detection criteria update responsive to receiving the detection data signal.

6. The weather radar system of claim 1, wherein:
 the entity detector provides detection data including at least one of reflectivity, thunderstorm core location, or cloud top temperature to the machine learning circuit;
 the machine learning circuit trains the radar detection model further based on the detection data; and
 the entity detector is configured to calculate the entity value to include a probability score of the radar data signal representing high altitude icing.

7. The weather radar system of claim 1, wherein:
 the entity detector provides detection data including at least one of reflectivity at a certain temperature or vertically integrated liquid;
 the machine learning circuit trains the radar detection model further based on the detection data; and
 the entity detector is configured to calculate the entity value to include a probability score of the radar data signal representing at least one of lightning, hail, or convection.

8. The weather radar system of claim 1, wherein:
 the entity detector provides detection data including at least one of a precipitation core location, radial convergence, vertically integrated liquid, or maximum reflectivity altitude;
 the machine learning circuit trains the radar detection model further based on the detection data; and
 the entity detector is configured to calculate the entity value to include a probability score of the radar data signal representing at least one of a windshear or a microburst.

9. A method, comprising:
 generating, by a radio frequency (RF) receiver, a radar data signal based on a received radar return;
 calculating, by an entity detector, an entity value based on the radar data signal;
 comparing, by the entity detector, the entity value to a threat detection threshold;
 outputting, by the entity detector, an indication of a threat based on the entity value exceeding the threat detection threshold;
 receiving, by a machine learning circuit, the radar data signal;
 receiving, by the machine learning circuit, at least one of (1) sensor data regarding an environment about an antenna or (2) platform state data regarding a platform to which the antenna is coupled;
 executing, by the machine learning circuit, a radar detection model to calculate an updated threat detection criteria based on the radar data signal and the at least one of the sensor data or the platform state data, wherein the radar detection model includes a convolutional neural network including an input layer, a plurality of hidden layers, and an output layer;

providing, by the machine learning circuit to the entity detector, the updated threat detection criteria to update the entity detector; and training the radar detection model, by the machine learning circuit, by:
    providing training data to the input layer of the convolutional neural network of the radar detection model, the training data including historical radar data mapped to at least one of (1) historical sensor data or (2) historical platform state data;
    causing the radar detection model to generate one or more model threats;
    comparing the one or model threats to one or more historical threats corresponding to the historical radar data; and
    modifying at least one of a bias or a weight of the plurality of hidden layers of the convolutional neural network of the radar detection model to reduce a difference between the one or more model threats and the one or more historical threats.

10. The method of claim 9, comprising generating, by the entity detector, the entity value to indicate a probability score of the radar data signal representing the threat.

11. The method of claim 9, comprising:
transmitting, by the entity detector using a wireless communications circuit, the radar data signal as a detection data signal to a remote radar system that implements the machine learning circuit;
using, by the remote radar system, the machine learning circuit to generate a detection criteria update including the updated threat detection threshold; and
transmitting, by the remote radar system, the detection criteria update for reception by the wireless communications circuit.

12. The method of claim 11, comprising generating the detection criteria update as a service bulletin.

13. The method of claim 11, comprising generating the detection criteria update responsive to receiving the detection data signal.

14. The method of claim 11, comprising detecting, by the entity detector, at least one of high altitude icing, lightning, hail, convection, turbulence, windshear, or microburst.

15. A weather radar apparatus, comprising:
an antenna configured to receive radar returns and output a radio frequency (RF) signal based on the received radar returns;
an RF receiver coupled to the antenna and configured to generate a radar data signal based on the RF signal; and
a base assembly supporting the RF receiver, the base assembly including:
    an entity detector configured to:
        calculate a threat value based on the radar data signal;
        compare the threat value to a threat detection threshold; and
        output an indication of the threat based on the threat value exceeding the threat detection threshold; and
    a machine learning circuit configured to:
        receive the radar data signal;
        receive at least one of (1) sensor data regarding an environment about the antenna or (2) platform state data regarding a platform to which the antenna is coupled;
        execute a radar detection model to calculate an updated threat detection threshold based on the radar data signal and the at least one of the sensor data or the platform state data, wherein the radar detection model includes a convolutional neural network including an input layer, a plurality of hidden layers, and an output layer; and
        provide the updated threat detection threshold to the entity detector to update the entity detector,
the machine learning circuit trains the radar detection model by;
    providing training data to the input layer of the convolutional neural network of the radar detection model, the training data including historical radar data mapped to at least one of (1) historical sensor data or (2) historical platform state data;
    causing the radar detection model to generate one or more model threats;
    comparing the one or model threats to one or more historical threats corresponding to the historical radar data; and
    modifying at least one of a bias or a weight of the plurality of hidden layers of the convolutional neural network of the radar detection model to reduce a difference between the one or more model threats and the one or more historical threats.

16. The weather radar apparatus of claim 15, wherein:
the base assembly is coupled to a pedestal including at least one motor; and
the base assembly includes power electronics configured to drive the at least one motor to adjust an orientation of the RF receiver about at least one of a scan axis or an elevation axis.

17. The weather radar apparatus of claim 15, wherein the machine learning circuit includes a system-on-a-chip (SoC) configured for machine learning operations.

* * * * *